United States Patent
Xue et al.

(10) Patent No.: US 11,067,831 B2
(45) Date of Patent: Jul. 20, 2021

(54) METHODS OF MANUFACTURING COATED CONTACT LENSES

(71) Applicant: CooperVision International Limited, Fareham (GB)

(72) Inventors: Hong Xue, Pleasanton, CA (US); Yuwen Liu, Dublin, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 390 days.

(21) Appl. No.: 16/136,484

(22) Filed: Sep. 20, 2018

(65) Prior Publication Data

US 2019/0129202 A1 May 2, 2019

Related U.S. Application Data

(60) Provisional application No. 62/578,727, filed on Oct. 30, 2017.

(51) Int. Cl.
| | | |
|---|---|---|
| *G02C 7/04* | (2006.01) | |
| *G02B 1/04* | (2006.01) | |
| *B29D 11/00* | (2006.01) | |
| *B29K 83/00* | (2006.01) | |
| *B29K 105/00* | (2006.01) | |

(52) U.S. Cl.
CPC ........ *G02C 7/049* (2013.01); *B29D 11/00865* (2013.01); *G02B 1/043* (2013.01); *B29D 11/00038* (2013.01); *B29K 2083/00* (2013.01); *B29K 2105/0061* (2013.01); *B29K 2823/12* (2013.01); *G02C 2202/16* (2013.01)

(58) Field of Classification Search
CPC .. G02C 7/049; G02B 1/043; B29D 11/00865; B29D 11/00038
USPC .......................... 351/159.02, 159.33, 159.73
See application file for complete search history.

(56) References Cited

U.S. PATENT DOCUMENTS

| | | |
|---|---|---|
| 8,011,784 B2 | 9/2011 | Liu |
| 8,044,112 B2 | 10/2011 | Matsuzawa |
| 8,168,735 B2 | 5/2012 | Ichinohe |
| 8,865,789 B2 | 10/2014 | Yao et al. |
| 8,939,577 B2 | 1/2015 | Qiu et al. |
| 9,498,035 B2 | 11/2016 | Luk et al. |
| 9,550,011 B2 | 1/2017 | Xie |
| 2007/0296914 A1 | 12/2007 | Hong et al. |
| 2008/0226922 A1* | 9/2008 | Ferreiro ................. G02B 1/043 428/413 |
| 2010/0168855 A1* | 7/2010 | McGee .................. A61L 27/34 623/11.11 |
| 2011/0027335 A1 | 2/2011 | Fortune et al. |
| 2014/0008824 A1* | 1/2014 | Niu .................. B29D 11/00259 264/1.1 |
| 2014/0055741 A1 | 2/2014 | Havenstrite et al. |
| 2014/0174957 A1* | 6/2014 | Rogers ................... G02B 1/043 206/5.1 |
| 2014/0179825 A1 | 6/2014 | Rogers et al. |
| 2015/0094393 A1* | 4/2015 | Holland ................. G02B 1/043 522/66 |
| 2016/0054475 A1* | 2/2016 | Wang ..................... G02B 1/043 53/431 |
| 2016/0326046 A1 | 11/2016 | Quinter et al. |
| 2017/0038501 A1 | 2/2017 | Kolluru et al. |
| 2017/0160432 A1 | 6/2017 | Havenstrite et al. |
| 2017/0165932 A1 | 6/2017 | Qian et al. |
| 2020/0283560 A1* | 9/2020 | Geraths ............ B29D 11/00048 |

FOREIGN PATENT DOCUMENTS

| | | |
|---|---|---|
| CN | 1415077 A | 4/2003 |
| CN | 104956256 A | 9/2015 |
| CN | 106999295 A | 8/2017 |
| KR | 20090119845 A | 11/2009 |
| WO | 0127662 A1 | 4/2001 |
| WO | 2014008824 A | 10/2013 |
| WO | 2014179825 A | 9/2015 |
| WO | 2017182813 A1 | 10/2017 |

OTHER PUBLICATIONS

Office Action issued in corresponding Korean Patent Application No. 10-2020-7015034 dated Jul. 24, 2020 (with partial English translation)(13 pages).
Office Action issued in corresponding Chinese Patent Application No. 201880070654.8 dated Sep. 23, 2020 (with partial English translation)(14 pages).

* cited by examiner

*Primary Examiner* — Travis S Fissel
(74) *Attorney, Agent, or Firm* — Kilyk & Bowersox, P.L.L.C.

(57) ABSTRACT

Methods are disclosed for manufacturing a coated contact lens that comprises a polymeric lens body comprising an acid group, a first coating polymer comprising a first amine group ionically bound to the acid group, and a second coating bound to the first coating polymer through covalent linkage between a nitrogen atom of a second amine group on the first coating polymer and an amine-reactive group of the second coating polymer. In some examples the lenses exhibit improved surface properties compared to uncoated lenses, such as reduced adhesion, increased wettability, increased lubricity, and/or increased lipid resistance.

23 Claims, No Drawings

METHODS OF MANUFACTURING COATED CONTACT LENSES

This application claims the benefit under 35 U.S.C. § 119(e) of prior U.S. Provisional Patent Application No. 62/578,727, filed Oct. 30, 2017, which is incorporated in its entirety by reference herein.

FIELD

The field of the invention relates to the manufacture of coated contact lenses.

BACKGROUND

Surface properties of contact lenses have been demonstrated to affect contact lens comfort. Examples of such surface properties include adhesion, wettability, coefficient of friction and lipid resistance. New methods of coating contact lens surfaces to improve the properties that can affect contact lens comfort are desired.

Background publications include U.S. Pat. Nos. 9,498,035, 8,939,577, and 8,011,784

SUMMARY

Methods are provided for manufacturing coated contact lenses. The method comprises contacting a polymeric lens body comprising an acid group with a first coating polymer comprising an amine group, wherein a first portion of the amine group ionically binds to the acid group. The first coating polymer is contacted with a second coating polymer comprising an amine-reactive group under conditions in which a second portion of the amine group on the first coating polymer covalently binds to the amine-reactive group of the second coating polymer.

The resulting coated contact lens comprises a polymeric lens body comprising an acid group, a first coating polymer comprising an amine group, wherein a first portion of the amine group is ionically bound to the acid group, and a second coating polymer bound to the first coating polymer through covalent linkage between a nitrogen atom of a second portion of the amine group on the first coating polymer and an amine-reactive group of the second coating polymer.

DETAILED DESCRIPTION

Methods of manufacturing coated contact lenses are disclosed in which a polymeric lens body comprising acid groups is contacted with a first coating polymer comprising amine groups under conditions in which the acid groups ionically bind to a portion of the amine groups to provide a polymeric lens body with an ionically bound first coating. A second coating polymer comprising amine-reactive groups is contacted with the first coating polymer under conditions in which available (i.e. an unbound second portion of) amine groups of the first coating polymer covalently bind to the amine-reactive groups of the second polymer. The resulting contact lens comprises a polymeric lens body comprising an acid group, a first coating polymer comprising an amine group ionically bound to the acid group, and a second coating polymer bound to the first coating polymer through covalent linkage between a nitrogen atom of an amine group on the first coating polymer and an amine-reactive group of the second coating polymer. The resultant contact lens has a stable coating that may confer the contact lens with one or more desirable property such as enhanced lubricity, increased wettability and comfort, lipid resistance, antimicrobial activity, or other desirable property.

The polymeric lens body may comprise any polymer matrix material suitable for contact lenses. As used herein, the term "polymeric lens body" refers to a polymer matrix material in the shape of a contact lens. Examples of polymer matrix materials suitable for contact lenses are well-known in the art and include so-called "conventional" hydrogels, which are silicone-free hydrogels typically comprising copolymers of hydroxyethyl methacrylate and methacrylic acid, silicone hydrogels, silicone elastomers, and fluorosilicone acrylates, among others. As used herein, a composition is considered to comprise silicone if it comprises at least one Si—O—Si group in its molecular structure.

In one example, the polymeric lens body comprises a polymerization product of a curable composition comprising at least one acid group-containing molecule. A curable composition comprises one or more molecules having reactive groups that, under curing conditions undergo cross-linking and/or polymerization to form a polymer matrix. In a specific example the curable composition comprises a mixture of monomers including at least one acid group-containing monomer and at least one hydrophilic monomer. In such example, the monomers copolymerize to provide a polymeric lens body that upon hydration forms an anionic hydrogel. As used herein, the term "monomer" refers to any molecule capable of reacting in a polymerization reaction with one or more other molecules having the same or different structure to form a homopolymer or copolymer. Thus, the term encompasses polymerizable pre-polymers and macromers, there being no size-constraint of the monomer unless indicated otherwise.

Examples of acid groups include carboxylic acid, phosphoric acid, sulfonic acid, and amino acid. Examples of acid group-containing monomers that may be included in the monomer mixture include (meth)acrylic acid, itaconic acid, crotonic acid, cinnamic acid, vinylbenzoic acid, fumaric acid, maleic acid, monoesters of fumaric acid, N-vinyloxy-carbonyl-L-alanine, 2-acrylamido-2-methylpropane sulfonic acid, 2-sulfoethyl (meth)acrylate, carboxyethyl acrylate, and 3-methacryloyl-(1)-lysine. For convenience, the nomenclature "(meth)acrylate" is used herein to refer to either one of two monomers that differ only by the presence or absence of a single methyl group attached to an acrylate group. Thus, for example, the term "(meth)acrylic acid" can refer to either acrylic acid or methacrylic acid, whereas "methacrylic acid", without the parentheses around "meth", refers only to methacrylic acid. Lists of "examples" throughout this disclosure are intended as non-limiting. In light of the present disclosure, one skilled in the art would be able to readily identify suitable alternatives not specifically included in such lists for manufacturing the coated contact lenses described herein. Other monomers that may be used in the curable composition are well-known in the art. For example, curable compositions for manufacturing silicone hydrogel contact lenses comprising acid-containing groups are described in U.S. Pat. No. 9,498,035.

The acid group-containing monomer is included in the monomer mixture in an amount to provide the resulting contact lens with an ionic content of from about 0.2%, 0.4%, 0.6%, 0.8%, 1.0%, 1.2%, or 1.5% up to about 2%, 3%, 4%, 6% or 10%. Throughout this description, when a series of lower limit ranges and a series of upper limit ranges are provided, all combinations of the provided ranges are contemplated as if each combination were specifically listed. For example, in the above listing of ionic content percentages, all 28 possible percent ionic content ranges are contemplated (i.e. 0.2% up to about 2.0%, 0.4% up to about 2.0% . . . 1.5% up to about 4%, and 1.5% up to about 6%).

As used herein a % ionic content is determined by Equation 1:

$$\Sigma(a_n \times b_n / c_n) \times 89 = \% \text{ ionic content} \quad (1)$$

where $a_n$ is the weight percentage, as defined below, of acid group-containing monomer n used in the monomer mixture, $b_n$ is the number of negatively-charged groups on monomer n at pH 7 (for example, the number of carboxylate, phosphate, phosphonate, phosphonic, sulfonate, sulfate and sulfite groups in the monomer), and $c_n$ is the molecular weight of acid group-containing monomer n. If more than one acid group-containing monomer is used in a monomer mixture, the % ionic content of the resulting polymeric lens body is the sum of the % ionic content provided by each acid group-containing monomer n. The weight percentage of the acid group-containing monomer n in the monomer mixture is relative to the weight of all components of the monomer mixture that incorporate into the final polymeric lens body. Therefore, ingredients such as diluents that are removed from the hydrogel during the manufacturing process, are not included in the weight percent determination. Equation 1 adjusts for differences in molecular weight and charge relative to methacrylic acid, an acid group-containing monomer commonly used in non-silicone hydrogel contact lenses made from 2-hydroxyethyl methacrylate (HEMA), such as ocufilcon D, etafilcon A, and methafilcon A. Methacrylic acid has a molecular weight of 89 and one ionic group. Thus, for example, the ionic content of a polymerization product of a composition that comprises 2.0 wt. % of N-vinyloxycarbonyl-L-alanine (MW=159, 1 ionic group) and no other acid group-containing monomers is calculated as follows: (2.0/159)×(89)=1.1% ionic content. The ionic content of a hydrogel prepared from a composition that comprises 2.0 wt. % itaconic acid (MW=130, 2 ionic groups) and no other acid group-containing monomers is calculated as follows: (2.0×2/130)×89=2.7% ionic content.

The monomer mixture may comprise one or more monomers in addition to the acid-containing monomer. Examples of hydrophilic monomers commonly used for silicone hydrogels and/or conventional hydrogels include N-vinyl-N-methyl acetamide, N-vinyl pyrrolidone, ethylene glycol vinyl ether, diethylene glycol vinyl ether, 2-hydroxyethyl methacrylate, 2-methacryloyloxyethyl phosphorylcholine, and vinyl alcohol. Other monomers commonly used in silicone hydrogel and non-silicone hydrogel contact lenses are well-known in the art (see e.g. U.S. Pat. Nos. 8,865,789 and 9,498,035, incorporated herein by reference).

In one example, the polymeric lens body is a polymerization product of a monomer mixture comprising at least one silicone monomer and at least one carboxylic acid-containing monomer in an amount that provides the resulting polymerization product with an ionic content of about 1.0%, 1.4% or 1.6% up to about 1.8%, 2.0% or 2.2%. Such monomer mixture may additionally comprise a hydrophilic monomer. In one example, the hydrophilic monomer is selected from N-vinyl-N-methylacetamide (VMA), N-vinyl pyrrolidone (NVP), or a combination of both VMA and NVP. In a further example, the monomer mixture comprises about 25 wt. %, 30 wt. %, or 35 wt. % up to about 55 wt. %, 60 wt. %, or 65 wt. % of the hydrophilic monomer. Exemplary silicone monomers that may be included in the monomer mixture are disclosed in U.S. Pat. No. 9,498,035, and in the Examples below.

As will be appreciated by those skilled in the art, the polymerizable composition will typically comprise non-polymerizable ingredients, in addition to the polymerizable ingredients, that are conventionally used in contact lens formulations. For example, the polymerizable composition will typically include a polymerization initiator, a UV absorbing agent, and a tinting agent. Examples of these and additional ingredients that may be included in the polymerizable composition are described in U.S. Pat. Appl. Publ. No. 2007/0296914.

Contact lenses can be made from the polymerizable compositions described herein using curing and other processing methods known in the field, such as cast molding, spin casting, injection molding, forming a polymerized rod that is subsequently lathed, etc. In a specific example, the polymerizable composition is cast molded between molds formed of a thermoplastic polymer, such as polypropylene or ethylene vinyl alcohol. Briefly, a first mold member defining the front surface of the contact lens, referred to as a "female mold member", is filled with an amount of the polymerizable composition sufficient to form a single polymeric lens body. A second mold member defining the back (i.e. eye-contacting) surface of the contact lens, referred to as the "male mold member", is coupled to the female mold member to form a mold assembly having a lens-shaped cavity with the amount of polymerizable composition therebetween. The polymerizable composition within the contact lens mold assembly is polymerized using any suitable curing method, such as by exposure to polymerizing amounts of heat or ultraviolet light (UV). In the case of UV-curing, the polymerizable composition typically comprises a photoinitiator such as benzoin methyl ether, 1-hydroxycyclohexylphenyl ketone, Darocur or Irgacur (available from Ciba Specialty Chemicals). In the case of heat-curing, the polymerizable composition typically comprises a thermal initiator such as 2,2'-azobis(2,4-dimethylpentanenitrile) (VAZO-52), 2,2'-azobis(2-methylpropanenitrile) (VAZO-64), or 1, 1'-azo bis(cyanocyclohexane) (VAZO-88).

At the completion of curing, the male and female mold members are separated and the polymeric lens body is removed. The polymeric lens body is typically washed to remove unreacted or partially reacted ingredients and, in the case of hydrogels, to hydrate it. The resulting polymeric lens body is anionic by virtue of the acid containing-groups having a negative charge at pH 7. As used herein, the term "acid group-containing monomer" also includes monomers that can undergo hydrolysis to provide an acid group at about pH 7. For example, trimethysilyl methacrylate (TMSMA) may be included in a monomer mixture and polymerized. When the resulting polymeric lens body is washed or hydrated, the trimethylsilyl group hydrolyses to generate methacrylic acid (i.e. the structure of a polymerized methacrylic acid monomer).

In some examples, a polymeric lens body having no acid-containing groups may be used. In such example, the polymeric lens body may be subjected to a post-curing modification step in which acid-containing groups are covalently attached to the surface of the lens body. For example, acid-containing groups may be grafted to the surface of a polymeric lens body by plasma deposition.

A first coating polymer comprising an amine group is ionically bound to the acid group on the polymeric lens body. The amine group may be a primary amine, a secondary amine, a tertiary amine, or combinations thereof. Examples of primary and secondary amine-containing polymers include those formed by polymerization of one or more of the following monomers: allylamine, N-(2-aminoethyl)

(meth)acrylamide, N-(3-aminopropyl) (meth)acrylamide, 2-aminoethyl (meth)acrylate, 2-(tert-butylamino)ethyl (meth)acrylate. 2-(tert-butyl)amino ethyl methacrylate, and 2-(tert-butyl)amino methylstyrene. Examples of tertiary amine-containing polymers include those formed by polymerization of one or more of the following monomers: 2-(diethylamino)ethyl (meth)acrylate, 2-(dimethylamino)ethyl (meth)acrylate, 2-N-morpholinoethyl (meth)acrylate, N-[3-(N,N-dimethylamino)propyl] acrylamide, N-[3-(N,N-dimethylamino)propyl] (meth)acrylamide, 2-diisopropylaminoethyl (metha)crylate, vinyl imidazole, vinyl triazole, and vinyl pyridine. Other examples of amine-containing polymers include chitosan and poly(amino acids) such as α-poly-L-lysine, ε-poly-L-lysine, poly-L-tryptophan, poly-L-histidine, and poly-L-arginine. The amine-containing polymers may be homopolymers or may be copolymers comprising units derived from copolymerization with one or more different monomer. The different monomer may contain no amine group or, alternatively, it may also be an amine group-containing monomer. Thus, it will be appreciated that a reference herein to "a polymer comprising an amine group" encompasses homopolymers formed by polymerization of an amine group-containing monomer, copolymers formed by polymerization of an amine group-containing monomer with one or more different monomers that do not contain any amine groups, and copolymers formed by polymerization of at least two different amine group-containing monomers, optionally with one or more monomers that do not contain any amine groups.

In a specific example, the first coating polymer is a homopolymer or a copolymer of a monomer of Structure I below, where $R_1$ is hydrogen or a methyl group, A is an oxygen or nitrogen atom, n is an integer of 1 to 3, and each $R_2$ is independently a group selected from methyl, ethyl, propyl, and butyl. As used herein, a monomer having the structure of Formula 1 is referred to as a "dialkyl amino monomer".

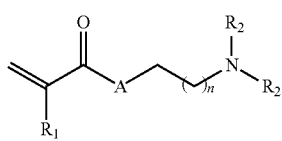

I

There is no particular constraint on the molecular weight of the first coating polymer. However, in some cases, polymers of very high molecular weight may form viscous solutions that are difficult to evenly coat onto the polymeric lens body. Typically the molecular weight of the first coating polymer is from about 1 k, 5 k, 15K, 30K, 100K, 500K or 1M up to about 2M, 5M, or 10M. The term "molecular weight" as used herein, refers to the number average molecular weight, Mn, as determined by MALDI-TOF or gel permeation chromatography.

The first coating polymer is contacted with the acid group-containing polymeric lens body under conditions that allow the first coating polymer to ionically bind to the polymeric lens body. In some examples, the polymeric lens body may be simply immersed in an aqueous solution of the first coating polymer. Conveniently, the solution of the first coating polymer may be room temperature, i.e. from about 15° C. to about 25° C. However, ionic binding may occur at higher and lower temperatures, thus the temperature of the solution of the first coating polymer may range from about 1° C. up to about 120° C. The optimal concentration of the first coating polymer and the duration of contact with the polymeric lens body may be determined by routine experimentation. Typically, the concentration of the first coating polymer in the coating solution may range from about 0.01 wt. %, 0.1 wt. %, or 0.5 wt. % up to about 2 wt. %, 5 wt. %, 10 wt. %, or 20 wt. %. Binding may occur in a matter of minutes. The polymeric lens body may be contacted with a solution of the first coating polymer in one or more steps. For example, in a two-step coating, the polymeric lens body may be immersed in the solution for a given period of time to allow the first coating polymer to ionically bind to the polymeric lens body, removed from the solution, and then immersed in fresh coating solution for a second period of time. In some examples, the total period of time in which the polymeric lens body is contacted with the solution of the first coating polymer is 5 minutes, 10 minutes, or 15 minutes, up to about 30 minutes, 60 minutes, 120 minutes, or 360 minutes.

In some examples, the polymeric lens body may be spray-coated or spin-coated with an aqueous solution of the first coating polymer. These methods of applying the coating polymer are useful in cases where it is desirable to have only one side of the contact lens coated, i.e. either the posterior, i.e. cornea-contacting, side of the lens, or the anterior, i.e. eye lid-contacting, side of lens. Other coating condition parameters, such as whether the polymeric lens body is hydrated or dry when contacted with the first coating polymer, the osmolality of the coating solution, the pH of the coating solution, etc. may be determined by routine optimization.

The method of manufacturing the coated contact lenses described herein additionally comprises contacting the first coating polymer with a second coating polymer comprising an amine-reactive group under conditions in which a second portion of the amine group on the first coating polymer covalently binds to the amine-reactive group. Thus, it will be appreciated that the ionic content of the polymeric lens body and the amine group content of the first coating polymer are selected such that when the first coating polymer has bound to the polymeric lens body, unbound amine groups (i.e. a second portion of the amine group) are still available on the first coating polymer to bind to the second coating polymer. Similarly, in examples where the first coating polymer is contacted with the second coating polymer prior to contacting the first coating polymer with the polymeric lens body, the number of amine-reactive groups present in the second coating polymer is selected such that after the first coating polymer has bound to the second coating polymer, unbound amine groups are still available on the first coating polymer to ionically bind to the polymeric lens body.

The skilled artisan will appreciate that it is not required that every amine-reactive group of the second coating polymer react with an amine group of the first coating polymer, provided that the resulting coating is stable. Likewise, there may be a portion of amine groups on the first coating polymer that have not bound to either of the acid group of the polymeric lens body or the amine-reactive group of the second coating polymer. Finally, it will also be appreciated that the coated contact lens may comprise acid groups present in the polymeric lens body that have not bound to the first coating polymer.

Examples of amine-reactive groups that covalently bind to primary amine groups, usually by either acylation or alkylation, include isothiocyanates, isocyanates, acyl azides, N-hydroxysuccinimide (NHS) esters, sulfonyl chlorides, aldehydes, glyoxals, epoxides oxiranes, carbonates, aryl halides, imidoesters, carbodiimides, anhydrides, and fluorophenyl esters. Amine-reactive groups that form covalent bonds with tertiary amine groups include alkyl halides.

The second coating polymer may be a polymer that has been modified to contain an amine-reactive group. For example, methods of functionalizing polyvinylpyrrolidone (PVP) with NHS are described in U.S. Pat. No. 9,550,011, and U.S. Pat. Publ. No. 2011/0027335. Alternatively, the coating polymer may be prepared by polymerization or copolymerization of at least one monomer comprising an amine-reactive group. Examples of monomers comprising primary and secondary amine-reactive groups include (meth)acrylic anhydride, itaconic anhydride, (meth)acryloyl chloride, (meth)acryloyloxyacetyl chloride, isocyanatoethyl (meth)acrylate, 3-isocyanotopropyl (meth)acrylate), and (meth)acrylic acid N-hydroxysuccinimide ester. Examples of monomers comprising tertiary amine-reactive groups include alkyl halides such as 3-chloro-2-hydroxypropyl (meth)acrylate (CHPMA), 3-chloro-2-hydroxypropyl vinyl ether, N-3-chloro-2-hydroxypropyl-N,N-diallylamine, 2-chloroethyl (meth)acrylate, 4-vinylbenzyl chloride, methyl 2-(chloromethyl)acrylate, 2-chloroethyl vinyl ether, 2-(2-bromoisobutyryloxy)ethyl methacrylate, ethyl 2-(bromomethyl)acrylate, and methyl 2-(bromomethyl)acrylate. Such monomers are referred to herein as "alkyl halide monomers".

In a specific example, the first coating polymer comprises tertiary amine groups and the second coating polymer comprises alkyl halide groups. The resulting contact lens comprises a first coating polymer comprising a first tertiary amine group ionically bound to an acid group at or near the surface of the polymeric lens body, and a second coating polymer covalently bound to the first coating polymer by a quaternary nitrogen atom formed by quaternization of a second tertiary amine group on the first coating polymer by reaction with an alkyl halide group on the second coating polymer.

In various examples, the second coating polymer is a polymer or copolymer comprising, or comprising units derived from: 2-methacryloyloxyethyl phosphorylcholine (MPC), n-vinylpyrrolidone, N-vinyl-N-methylacetamide, oxazolines, an amino acid (e.g. lysine), N,N-dimethyl acrylamide, carboxybetaine, sulfobetaine, polyethylglycol (PEG), a polysaccharide (e.g. hyaluronic acid, hydroxypropyl methylcellulose, carboxymethyl cellulose, etc.), and combinations thereof. In one example, the second coating polymer is a copolymer of a hydrophilic monomer and an alkyl halide monomer. In a specific example, the second coating polymer is a copolymer of methacryloyloxyethyl phosphorylcholine (MPC) and an alkyl halide monomer.

In examples where the second coating polymer comprises a copolymer of monomer comprising an amine-reactive group and one or more additional monomers free of amine-reactive groups, the amine-reactive component may comprise from about 0.1 wt. %, 1 wt. %, 5 wt. %, or 10 wt. %, up to about 50 wt. %, 70 wt. % or 95 wt. % of the polymer. Typically, the molecular weight of the second coating polymer is from about 10K, 100K, 500K or 1M up to about 2M, 3M, or 10M.

As indicated above, in some examples the first coating polymer is contacted with and covalently bound to the second coating polymer prior to contacting the first coating polymer with the polymeric lens body. In other examples, the first coating polymer is first contacted with and ionically bound to the polymeric lens body, and then the polymeric lens body is contacted with the second coating polymer under conditions in which available amine groups on the first coating polymer covalently bind to amine-reactive groups on the second coating polymer. In such examples, the polymeric lens body may be rinsed, for example with water, to remove unbound first coating polymer prior to being contacted with the second coating polymer. In yet other examples, the polymeric lens body may be contacted simultaneously with the first and second coating polymers under conditions in which the first coating polymer ionically binds to the polymeric lens body and covalently binds to the second coating polymer. In some examples, the second coating polymer may be included in a packaging solution. The polymeric lens body may be immersed in the packaging solution and the package sealed and autoclaved. In this example, the second coating polymer binds to the first coating polymer during autoclave.

In some examples, the second coating polymer may have a beneficial agent attached thereto that is released from the lens and delivered to the ocular tissue when the lens is worn. For example, the second coating polymer may comprise ionic groups (in addition to the amine-reactive groups) and be ionically bound to a beneficial agent that may be included in the packaging solution for the contact lens. In another example, the beneficial agent may be attached to the second coating polymer through hydrogen bonding. In yet another example, the beneficial agent may be covalently attached to the second coating polymer by a linking group that is cleaved or degraded by enzymes, such as lysozyme, in the wearer's tear film, thereby releasing the beneficial agent from the coating polymer. Examples of beneficial agents that may be attached to the second coating polymer include antimicrobial agents, pharmaceuticals, and comfort polymers.

In examples where the second coating polymer is coated onto the polymeric lens body prior to packaging, the polymeric lens body may be washed prior to packaging. Generally, the final manufactured product includes at least a sealed container containing an unused, sterile contact lens immersed in an aqueous lens packaging solution. The sealed container may be a hermetically sealed blister-pack, in which a concave well containing a contact lens is covered by a metal or plastic sheet adapted for peeling in order to open the blister-pack. The sealed container may be any suitable inert packaging material providing a reasonable degree of protection to the lens, such as a plastic material such as polyalkylene (e.g., polyethylene or polypropylene), PVC, polyamide, and the like. In some examples, the sealed container may comprise a plastic or glass vial with a threaded cap.

Coated contact lenses made according to the present description typically have at least one desired property that is improved relative to control lenses. As used herein, "control lenses" refer to lenses that comprise the same polymeric lens body as the coated lenses, and that are manufactured in the same manner as the coated lenses with the exception of the coating step(s). Examples of properties that may be improved include lens tear film stability, lipid deposit resistance, lubricity, etc.

The coated contact lenses described herein exhibit a reduction in the amount (by weight) of lipids deposited on the lens during wear compared to uncoated lenses. In one example, the coated contact lens has at least a 10%, 25%, 50% or 75% weight reduction in lipid deposition compared to an uncoated control lens. As used herein, a reduction in the amount of lipids deposited on a lens is determined using methods substantially as described in Example 3 below, or equivalent method. Briefly, coated and non-coated control lenses that have been worn for 10 hours in a non-dispensing clinical study are extracted to remove bound lipids. The lipid extract is dried and reconstituted in an appropriate solvent for quantitative analysis by lipid chromatography. In a specific example, the coated contact lens has at least a 10%, 25%, 50% or 75% reduction in deposition of wax ester. In another example, the coated contact lens has at least a 10%, 25%, 50% or 75% reduction in deposition of cholesteryl ester. In a specific example, the coated contact lens has at least a 10%, 25%, 50% or 75% reduction in the combined amount of cholesteryl ester and wax ester deposited on the lens.

In another example, the coated contact lens has a contact angle of less than 40° and the control contact lens has a contact angle of greater than 50°. As used herein, contact angle refers to the contact angle as determined by the captive bubble method using a drop shape analysis system (KRUSS DSA 100, or equivalent).

The following Examples illustrate certain aspects and advantages of the present invention, which should be understood not to be limited thereby.

EXAMPLE 1

Polymeric Lens Bodies Materials and Methods

Table 1 below lists abbreviations for chemicals used to make the monomer mixture formulations shown in the following examples.

TABLE 1

| Chemical | |
|---|---|
| Methacrylic acid | MAA |
| 2-Hydroxyethyl methacrylate | HEMA |
| Glycerol monomethacrylate | GMA |
| N-vinylpyrrolidone | NVP |
| N-vinyl-N-methylacetamide | VMA |
| Methyl methacrylate | MMA |
| Diethylene glycol vinyl ether | DEGVE |
| Ethylene glycol methyl ether methacrylate | EGMA |
| Allyl methacrylate | AMA |
| Ethylene glycol dimethacrylate | EGDMA |
| Triethylene glycol dimethacrylate | TEGDMA |
| Triethylene glycol divinyl ether | TEGDVE |
| Norbloc (CAS no. 96478-09-0) | Norbloc |
| Diphenyl (P-vinylphenyl) phosphine | pTPP |
| Pluronics P123 | P123 |
| Triphenyl phosphine | TPP |
| Reactive Blue 246 (CAS Reg. No. 121888-69-5) | RB246 |
| Reactive Blue 247 (CAS Reg. No. 109561-07-1) | RB247 |
| Reactive Blue 19-HEMA | RB19H |
| 2-2'-Azobis(2,4-dimethylvaleronitrile) | Vazo 52 |
| Azobisisobutyronitrile | Vazo 64 |
| 2-Allyloxy ethanol | AE |
| Deionized water | DI H$_2$O |

The silicone-containing molecules, which are not listed in Table 1 but are identified in the formulation tables below, have the following structures. The molecule referred to as "1622" has the structure of Formula II shown below. Methods of making this silicone monomer are described in U.S. Pat. No. 8,168,735.

II

The molecules referred to as "M5A" and "H10P16" in Table II have the general structure of Formula II shown below. In M5A, m is about 75, n is about 5, p is about 7, and R1 is a methyl group. In H10P16, m is about 75, n is about 10, p is about 16, and R1 is hydrogen. Methods of making siloxanes having the structure of Formula III are described in U.S. Pat. No. 8,129,442.

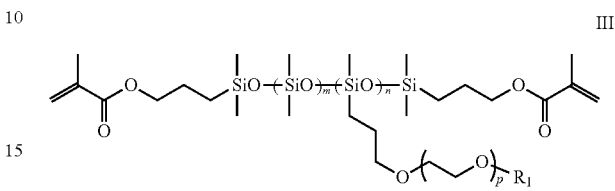

III

Unless indicated otherwise, the monomer mixture formulations provided in the following examples were prepared by weighing and mixing together the chemicals in the relative parts (by weight) indicated in the tables and filtered using a 0.2-5.0 micron filter. The mixtures were then cast molded in polypropylene contact lens mold assemblies and thermally cured in a nitrogen oven using conventional methods. Each cured lens was removed from its mold and hydrated and washed using multiple exchanges of deionized water to remove unreacted and partially reacted components from the hydrogel.

EXAMPLE 2

Coating Materials and Methods

The monomer mixtures shown in Table 2 below were prepared as described in Example 1.

TABLE 2

| CH10L | | XN7M03R | | NT43 | | 82MXP | |
|---|---|---|---|---|---|---|---|
| H10P16 | 30 | M5A | 8 | M5A | 10 | 1622 | 30 |
| HEMA | 50 | 1622 | 29 | 1622 | 30 | HEMA | 27 |
| GMA | 15 | VMA | 35 | VMA | 50 | NVP | 43 |
| MAA | 2.5 | MAA | 1.8 | MAA | 1.55 | MAA | 0.2 |
| TEGDMA | 0.5 | MMA | 8 | MMA | 15 | AMA | 0.1 |
| Vazo 52 | 0.8 | EGMA | 6 | EGDMA | 0.6 | EGDMA | 0.3 |
| RB246 | 0.02 | DEGVE | 5 | Vazo 64 | 0.5 | Vazo 64 | 0.5 |
| Water | 20 | EGDMA | 0.6 | AE | 1.4 | RB19H | 0.02 |
| — | — | TEGDVE | 0.1 | Norbloc | 0.9 | Norbloc | 1.7 |
| — | — | pTPP | 0.5 | TPP | 0.5 | P123 | 0.5 |
| — | — | Vazo 64 | 0.5 | — | — | — | — |
| — | — | RB247 | 0.01 | — | — | — | — |
| — | — | Norbloc | 1.7 | — | — | — | — |

The first coating polymer was prepared as follows. 80 g N-[3-(N,N-dimethylamino)propyl] acrylamide (DMAPMA) was dissolved in 240 g ethanol. The solution was flushed with nitrogen for 20 minutes before addition of 0.2 wt % Vazo 64. After polymerized for 24 hours at 65° C. the solvent was removed under reduced pressure. The residue was dissolved in 100 ml chloroform and pour into 700 ml hexane. This precipitation procedure was repeated three times. The obtained polymer was dried under reduced pressure to get white solid in 70% yield. The MALDI-TOF spectrum of polymer shows a molecular weight distribution from 2000 g/mol~10000 g/mol. A 1% solution of p(DMAPMA) in DI H$_2$O was prepared and filtered through a 1 μm hydrophilic filter. As used herein, references to "% solution" and "wt. %" refer to percent weight by weight (w/w) unless indicated otherwise.

The second coating polymer was prepared as follows: 10 g 3-chloro-2-hydroxypropyl methacrylate (CHPMA) and 40 g 2-methacryloyloxyethyl phosphorylcholine (MPC) were dissolved in 250 ml 50% ethanol and water mixture. The solution was flushed with nitrogen for 20 minutes before addition of 0.2 wt. % Vazo 64. After polymerization for 24 hours at 65° C., the solution was poured into dialysis tubing against water to allow dialysis for 3 days. The aqueous polymer solution was collected and freeze-dried in a lyophilizer until the polymer weight reached constant. The obtained random copolymer, p(CHPMA-MPC), had a ratio of CHPMA-MPC of about 1 to 4 and a molecular weight about 1.6 M. A 1% solution of p(CHPMA-MPC) in DI $H_2O$ was prepared and filtered through a 1 μm hydrophilic filter.

Polymeric lens bodies of formulations CH10L, XN7M03R, NT43, and 82MXP were each immersed in 4 ml of the p(DMAPMA) solution at room temperature for 2×20 min (i.e. the lenses were placed in two exchanges of the p(DMAPMA) solution for 20 minutes each, for a total of 40 minutes coating time). The lenses were then rinsed in 4 ml DI $H_2O$ at room temperature for 2×10 min.

After rinsing, the lenses were contacted with the p(CHPMA-MPC) solution at 80° C. for 2 hours and then rinsed again in DI $H_2O$ at room temperature for 2×30 min. The coated lenses were placed in vials with 4 ml PBS and autoclaved.

EXAMPLE 3

Qualitative and Quantitative Methods for Assessing Properties of Coated Contact Lenses The control and coated lenses were assessed by measuring water break-up time (WBUT), contact angle (CA), and lubricity. WBUT was measured by removing each lens from the solution using tweezers, holding each lens vertically up towards an overhead light source, and measuring how many seconds it takes for about 25% of the lens surface to become unwetted due to the film of water receding or breaking apart from the lens surface. Contact lenses having WBUTs of greater than 20 seconds are considered to have excellent wettability.

Contact angle was measured by the captive bubble method using a drop shape analysis system (KRUSS DSA 100, or equivalent). Contact angles of less than 50° are preferred.

Lubricity was measured by a tester, blinded to the identity of the lens, who rubbed the lens between the thumb and index finger. Scores of 0, 1, or 2 were given as follows: 0=lens feels extremely sticky, 1=feeling of friction, and 2=excellent lubricity.

The results of the above tests are shown in Table 3 which demonstrate the wettability and lubricity of coated lenses are improved significantly in comparison with uncoated lenses.

TABLE 3

| Formulation | Process | WBUT (s) | CA (°) | Lubricity score |
|---|---|---|---|---|
| CH10L | Uncoated | <15 | 63 | 0 |
|  | Coated | >20 | 34 | 2 |
| XN7M03R | Uncoated | <3 | 82 | 0 |
|  | Coated | >20 | 35 | 2 |
| NT43 | Uncoated | 20 | 56 | 1 |
|  | Coated | >20 | <40 | 2 |
| 82MXP | Uncoated | 20 | >80 | 0 |
|  | Coated | >20 | <40 | 2 |

Coated contact lenses of formulation NT43 and XN7M03R were sent to an ISO-compliant contract research laboratory for cytotoxicity testing using the ISO Direct Contact Method and the ISO Elution Method (ISO 10993-5, Biological evaluation of medical devices—Part 5: Tests for in vitro cytotoxicity). Under both testing procedures, the coated contact lens passed cytotoxicity testing.

The kinetic (dynamic) coefficient of friction (CoF) of the contact lenses was measured using a CETR Universal Micro-Tribometer (UMT) and CETR UMT Multi-Specimen Testing System software, with a pin-on-disk sample mount at ambient temperature. An adhesive-backed, 2.5" round polyethylene terephthalate film was adhered to the rotational disk, which is mounted on the mounting ring of the UMT. Each contact lens was picked up with tweezers and mounted onto the sample holder. 100 μL PBS was dispensed onto the PET substrate under the lens holder. The center of the lens on the pin tip was pressed against the PBS-wetted PET film moving at a constant sliding speed of 0.5 mm/sec at a constant load of 0.5 g for 12 seconds at a temperature between about 20° C. and 25° C. CoF values were computed by the software, and the average values (n=3) for each lens is shown in Table 4.

Lens adhesion force was measured using a TSA RSA G2 Dynamic Mechanical Analysis (DMA) instrument (TA Instruments) using two different probes: a hydrophilic stainless steel probe and a hydrophobic polypropylene probe at different hydration or dehydration conditions. The lenses are prepared first by damp blotting using a 1700 g load with the lens between an upper and lower blotting pad saturated in 34 g of saline solution. The lens is then transferred to the magnetic lens holder that secures the lens followed by engagement of the probe. The probe is first cleaned with IPA followed by engagement of the probe onto the lens at every 2 minutes. The adhesive force is then measured based on this engagement.

Contact lens tear film stability is evaluated by immersing a lens in an artificial tear solution (ATS) and monitoring the duration of surface dewetting and presence of color fringe. Tear film thickness is determined using an Interfacal Dewetting and Drainage Optical Platform or i-DDrOP, as described in U.S. Pat. No. 9,265,413. The lenses are preconditioned in phosphate buffer solution or blister/vial packaging solution and loaded on a dome within a trough which is immersed in 32 mL ATS as simulating on eye condition. The dewetting process is recorded on video by a Thorlabs camera (DCU223M) and analysis of the tear film is provided based on snapshots of the recording at 3 minutes. Coating thickness is determined by an analysis of any presence of a color fringe on the surface using a color analyzer software as a supplement to i-DDroP. The thickness value is based on the color intensity within a color map.

Various properties of coated and uncoated lenses for NT43 lenses were measured using the methods described above. The results in Table 4 show that the lubricity, surface adhesion force and tear film thickness of the coated lenses are improved significantly in comparison with uncoated lenses.

TABLE 4

| Properties | Uncoated Lens | Coated Lens |
|---|---|---|
| COF | 0.065 ± 0.021 | 0.053 ± 0.011 |
| Max. Surface adhesion force (g) | 5.13 ± 0.40 | 2.23 ± 0.79 |
| Tear film thickness (nm) | 100-200 | 100-400 |

Uncoated and coated NT43 lenses were evaluated for lipid deposition after 10 hours of wear in a non-dispensing clinical study (n=14). Briefly, the worn lenses were rinsed in Purilens solution, then extracted in a mixture of chloroform and methanol. The lens extract was removed and evaporated to dryness. The sample was reconstituted in isopropanol, and injected into a lipid chromatography system (Waters ACQUITY H-Class UPLC) equipped with a reverse phase column (BEH C18) and a mass spectrometer (Waters Xevo G2-S qTOF) for lipid detection and quantitation. The results provided in Table 5 show that coated lenses (Coated NT43) had lower amounts of lipid deposition than uncoated lenses (NT43), indicating that the coated lens have excellent anti-fouling properties.

TABLE 5

| Lipid | NT43 (μg/lens) | Coated NT43 (μg/lens) | % Reduction | % Increase |
|---|---|---|---|---|
| Wax esters | 0.932 | 0.036 | 96% | — |
| Cholesteryl esters | 0.191 | 0.026 | 86% | — |
| O-acyl-ω-hydroxy fatty acid | 0.045 | 0.017 | 62% | — |
| Cholesterol | 0.445 | 0.384 | 14% | — |
| Triglycerides | 0.013 | 0.004 | 69% | — |
| sphingomyelin | 0.001 | 0.001 | 0% | 0% |
| phosphatidylcholine | 0.002 | 0.003 | — | 50% |
| lisophosphatidylcholine | 0.050 | 0.040 | 20% | — |

EXAMPLE 4

Coating Contact Lenses by Primary or Secondary Amine Linkage

Lenses made according to Example 1 are immersed in 4 ml of 1% aqueous solution of poly(N-(3-aminopropyl)methacrylamide) at room temperature for 2×20 min. The lenses are then rinsed in 4 ml DI water at room temperature for 2×10 min. After rinsing, the lenses are contacted with a 1% aqueous solution of a copolymer of methacrylic acid N-hydroxysuccinimide ester and 1-vinyl-2-pyrrolidinone at room temperature for 30 mins, then rinsed again in DI water at room temperature for 2×30 min. The coated lenses are placed in vials with 4 ml PBS and autoclaved. The coated lenses show improved wettability and lubricity by comparison with uncoated lenses.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The present invention includes the following aspects/embodiments/features in any order and/or in any combination:

1. A method of manufacturing a coated contact lens comprising a) providing a polymeric lens body comprising an acid group; b) coating the polymeric lens body with a first coating polymer comprising an amine group, wherein a first portion of the amine group ionically binds to the acid group, and c) contacting the first coating polymer with a second coating polymer comprising an amine-reactive group under conditions in which a second portion of the amine group on the first coating polymer covalently binds to the amine-reactive group.
2. The method of 1, wherein the polymeric lens body comprises a silicone hydrogel.
3. The method of claim 1 or 2, wherein the acid group is carboxylic acid.
4. The method of any one of 1 to 3, wherein the first coating polymer is a polymer or a copolymer of a dialkyl amino monomer.
5. The method of any one of 1 to 4, wherein the polymeric lens body is coated with the first coating polymer prior to contacting the first coating polymer with the second coating polymer.
6. The method of any one of 1 to 4, wherein the polymeric lens body is coated with the first coating polymer after contacting the first coating polymer with the second coating polymer.
7. The method of any one of 1 to 6, wherein the second coating polymer comprises units derived from an alkyl halide monomer, for example a copolymer of an alkyl halide monomer and a hydrophilic monomer.
8. The method of any one of 1 to 7, wherein the second coating polymer is non-covalently bound to a beneficial agent, wherein the beneficial agent is released from the lens during wear.
9. The method of any one of 1 to 8, wherein the second coating polymer comprises units derived from 2-methacryloyloxyethyl phosphorylcholine.
10. A coated contact lens comprising: a) a polymeric lens body comprising an acid group; b) a first coating polymer comprising an amine group, wherein a first portion of the amine group is ionically bound to the acid group, and c) a second coating bound to the first coating polymer through covalent linkage between a nitrogen atom of a second portion of the amine group on the first coating polymer and an amine-reactive group of the second coating polymer.
11. The coated contact lens of 10, wherein the polymeric lens body is a polymerization product of a curable composition comprising at least one acid group-containing monomer, for example a monomer containing one or more of the following groups: a carboxylic acid group, a phosphoric acid group, a sulfonic acid group, or an amino acid group.
12. The coated contact lens of 10 or 11, wherein the first coating polymer is a polymer or a copolymer of a dialkyl amino monomer.
13. The method of any one of 10 to 12, wherein the polymeric lens body is coated with the first coating polymer prior to contacting the first coating polymer with the second coating polymer.
14. The method of any one of 10 to 12, wherein the polymeric lens body is coated with the first coating polymer after contacting the first coating polymer with the second coating polymer.
15. The method of any one of 10 to 12, wherein the first coating polymer is contacted simultaneously with the polymeric lens body and the second coating polymer.
16. The coated contact lens of any one of 10 to 15, wherein the second coating polymer comprises units derived from an alkyl halide monomer, for example a copolymer of an alkyl halide monomer and a hydrophilic monomer.

17. The coated contact lens of any one of 10 to 16, wherein the second coating polymer is non-covalently bound to a beneficial agent, wherein the beneficial agent is released from the lens during wear.

18. The coated contact lens of any one of 10 to 17, wherein the second coating polymer comprises units derived from 2-methacryloyloxyethyl phosphorylcholine.

19. The coated contact lens of any one of 10 to 18 having a reduction in lipid deposition compared to an uncoated control lens when tested ex vivo after 10 hours of lens wear, for example, at least a 50% reduction in combined amount (by weight) of cholesteryl ester and wax ester deposited on the lens.

What is claimed is:

1. A method of manufacturing a coated contact lens comprising:
   a) providing a polymeric lens body comprising an acid group;
   b) coating the polymeric lens body with a first coating polymer comprising an amine group, wherein a first portion of the amine group ionically binds to the acid group, and
   c) contacting the first coating polymer with a second coating polymer comprising an amine-reactive group under conditions in which a second portion of the amine group on the first coating polymer covalently binds to the amine-reactive group.

2. The method of claim 1, wherein the polymeric lens body comprises a silicone hydrogel.

3. The method of claim 1, wherein the acid group is carboxylic acid.

4. The method of claim 1, wherein the first coating polymer is a polymer or a copolymer of a dialkyl amino monomer.

5. The method of claim 1, wherein the polymeric lens body is coated with the first coating polymer prior to contacting the first coating polymer with the second coating polymer.

6. The method of claim 1, wherein the polymeric lens body is coated with the first coating polymer after contacting the first coating polymer with the second coating polymer.

7. The method of claim 1, wherein the second coating polymer comprises units derived from an alkyl halide monomer.

8. The method of claim 1, wherein the second coating polymer is non-covalently bound to a beneficial agent, wherein the beneficial agent is released from the lens during wear.

9. The method of claim 1, wherein the second coating polymer comprises units derived from 2-methacryloyloxyethyl phosphorylcholine.

10. A coated contact lens comprising:
    a) a polymeric lens body comprising an acid group;
    b) a first coating polymer comprising an amine group, wherein a first portion of the amine group is ionically bound to the acid group, and
    c) a second coating bound to the first coating polymer through covalent linkage between a nitrogen atom of a second portion of the amine group on the first coating polymer and an amine-reactive group of the second coating polymer.

11. The coated contact lens of claim 10, wherein the polymeric lens body is a polymerization product of a curable composition comprising at least one acid group-containing monomer.

12. The coated contact lens of claim 10, wherein the first coating polymer is a polymer or a copolymer of a dialkyl amino monomer.

13. The coated contact lens of claim 10, wherein the polymeric lens body is coated with the first coating polymer prior to contacting the first coating polymer with the second coating polymer.

14. The coated contact lens of claim 10, wherein the polymeric lens body is coated with the first coating polymer after contacting the first coating polymer with the second coating polymer.

15. The coated contact lens of claim 10, wherein the first coating polymer is contacted simultaneously with the polymeric lens body and the second coating polymer.

16. The coated contact lens of claim 10, wherein the second coating polymer comprises units derived from an alkyl halide monomer.

17. The coated contact lens of claim 10, wherein the second coating polymer is non-covalently bound to a beneficial agent, wherein the beneficial agent is released from the lens during wear.

18. The coated contact lens of claim 10, wherein the second coating polymer comprises units derived from 2-methacryloyloxyethyl phosphorylcholine.

19. The coated contact lens of claim 10 having a reduction in lipid deposition compared to an uncoated control lens when tested ex vivo after 10 hours of lens wear.

20. The method of claim 1, wherein the second coating polymer comprises a copolymer of an alkyl halide monomer and a hydrophilic monomer.

21. The coated contact lens of claim 11, wherein the acid-group containing monomer comprises a monomer containing one or more of the following groups: a carboxylic acid group, a phosphoric acid group, a sulfonic acid group, or an amino acid group.

22. The coated contact lens of claim 10, wherein the second coating polymer comprises a copolymer of an alkyl halide monomer and a hydrophilic monomer.

23. The coated contact lens of claim 10 having a reduction in lipid deposition compared to an uncoated control lens when tested ex vivo after 10 hours of lens wear, wherein said reduction is at least a 50% reduction in combined amount (by weight) of cholesteryl ester and wax ester deposited on the lens.

* * * * *